C. H. HAPGOOD.
SCALE.
APPLICATION FILED DEC. 29, 1911.
1,203,611.
Patented Nov. 7, 1916.
4 SHEETS—SHEET 4.
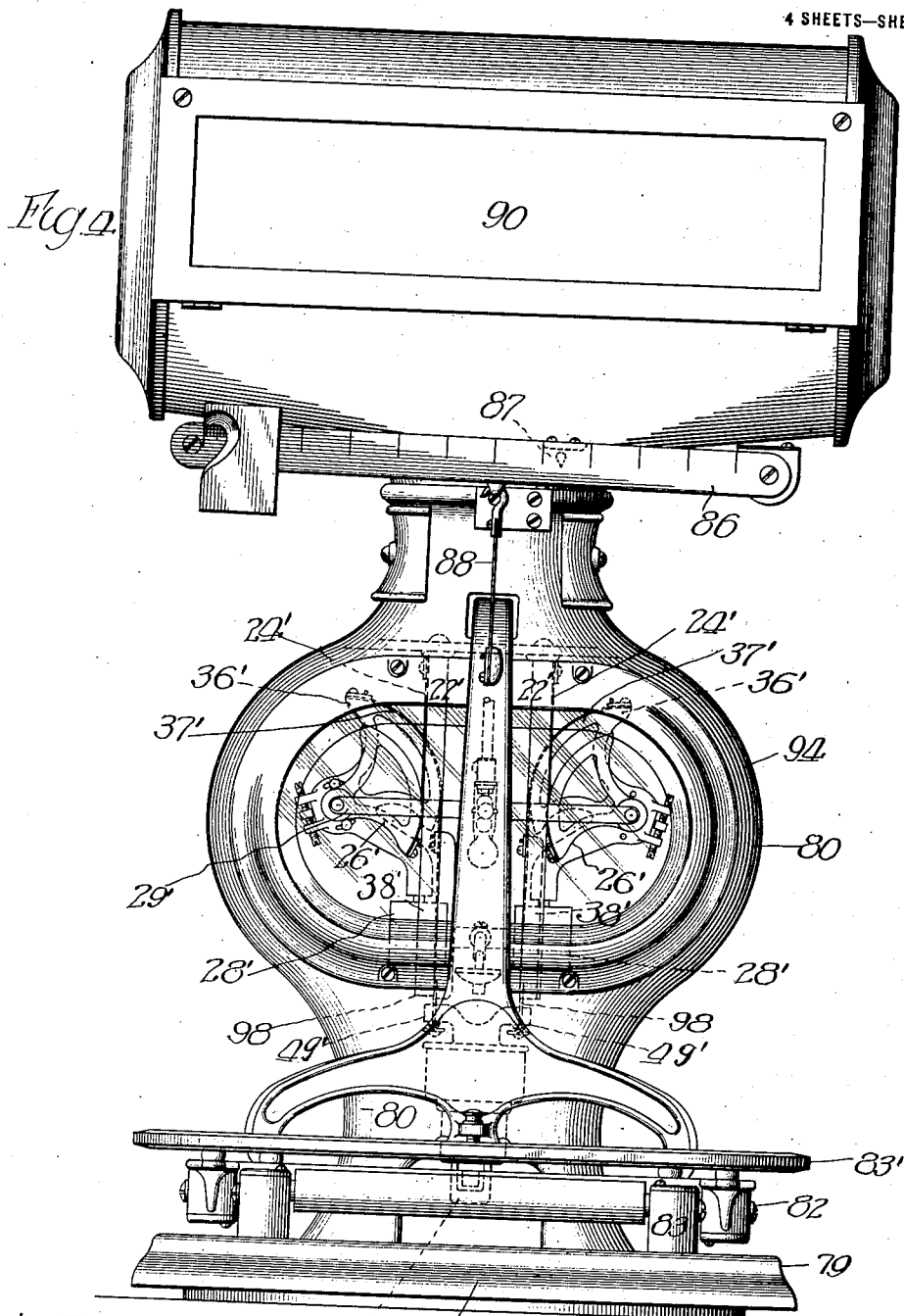

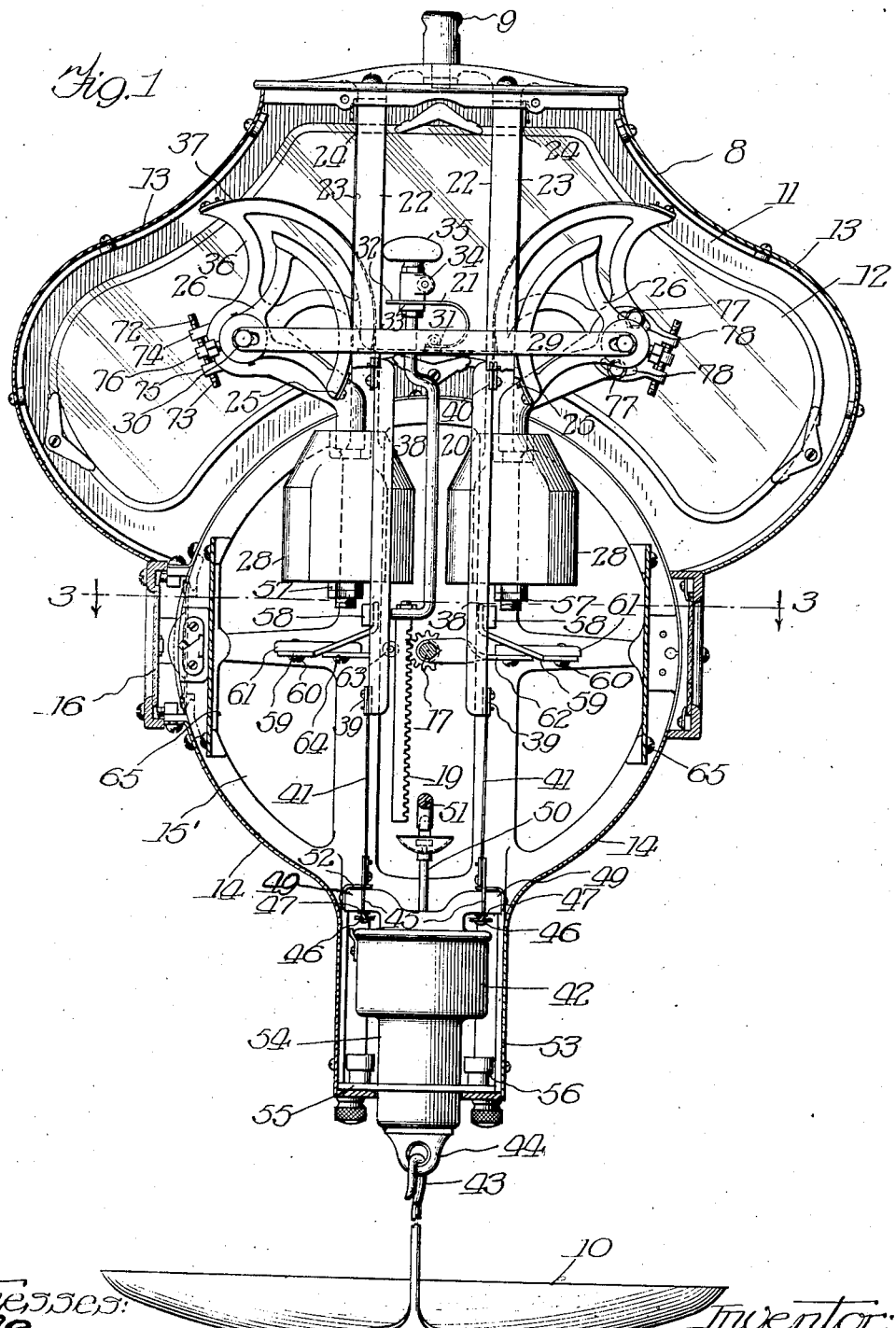

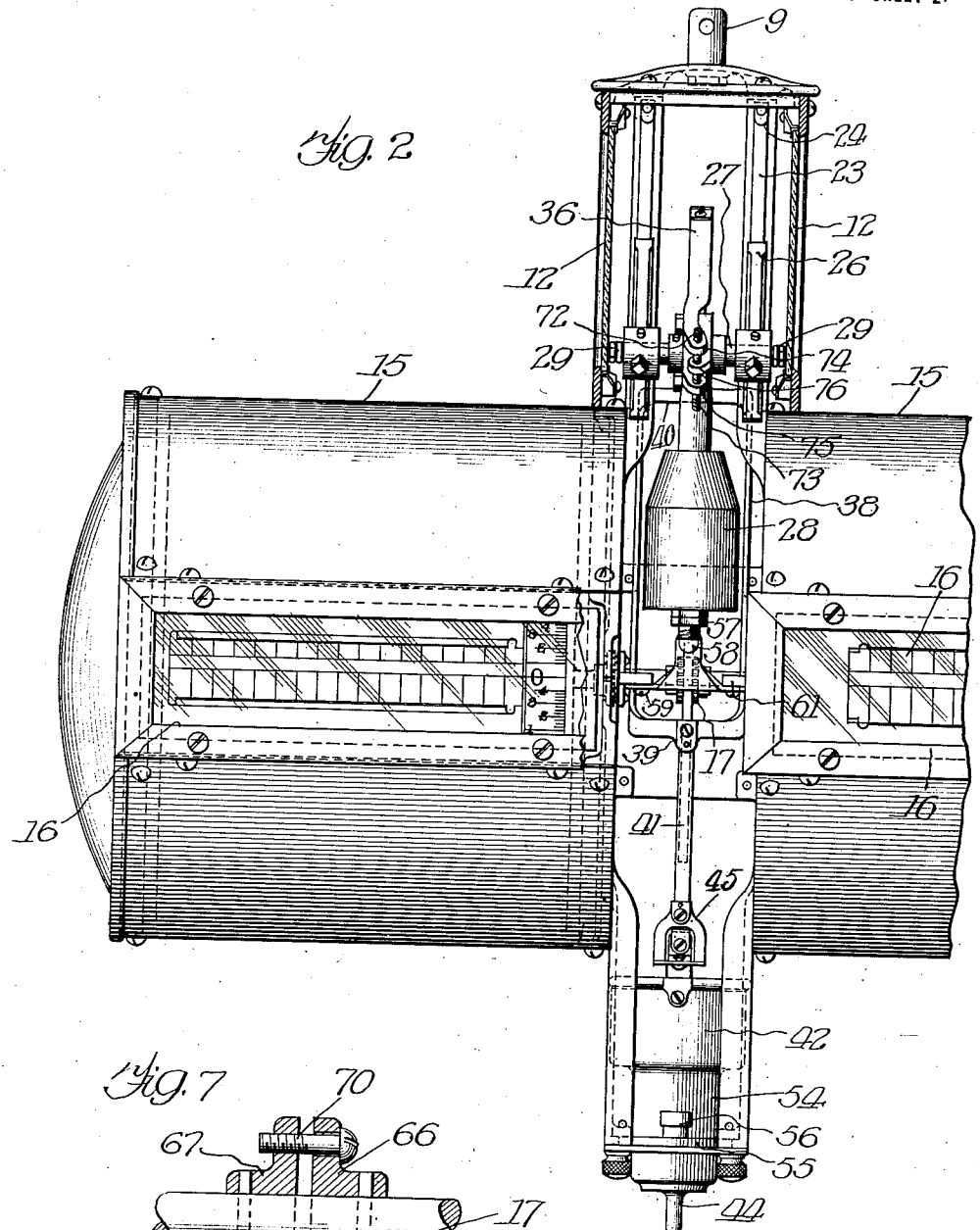

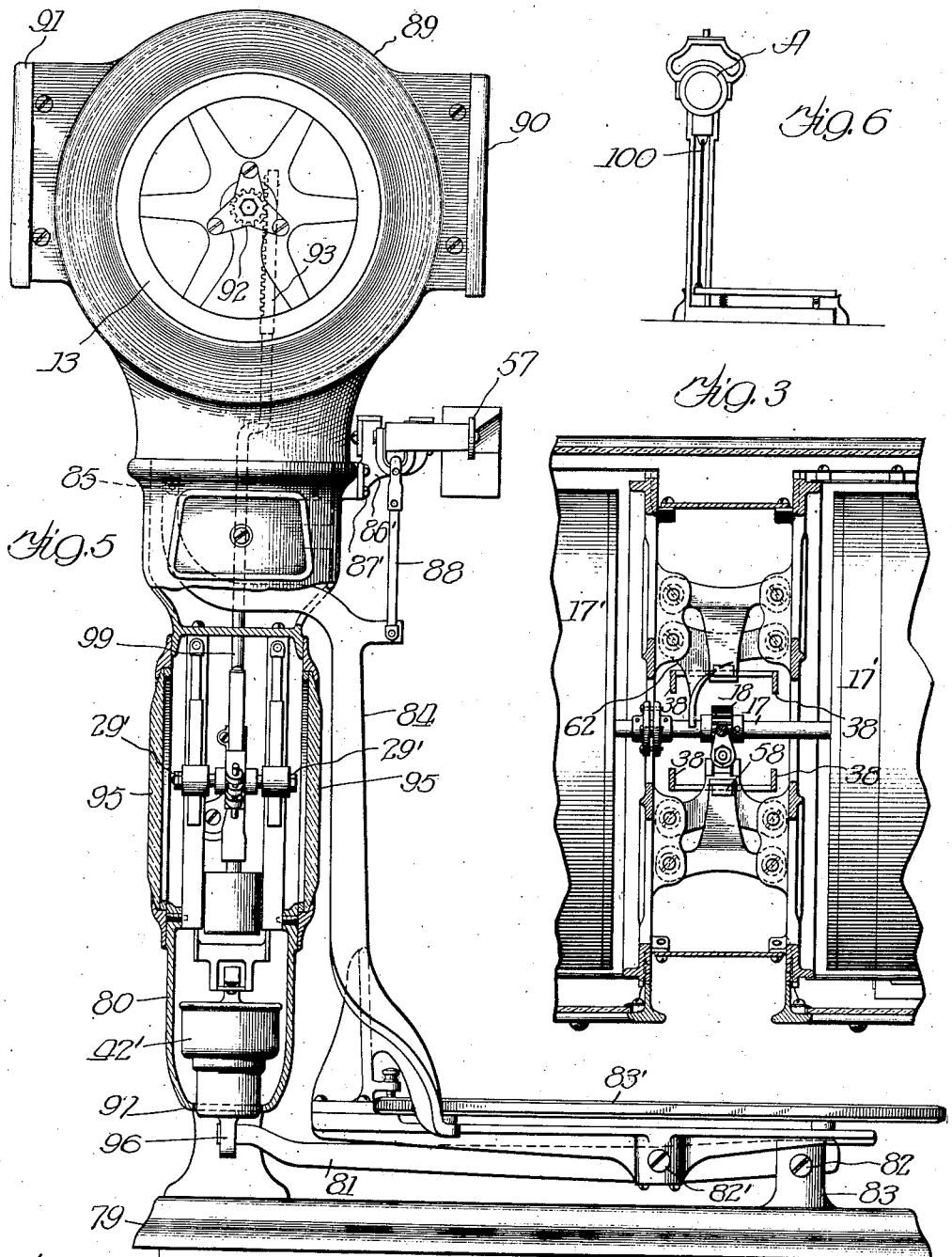

UNITED STATES PATENT OFFICE.

CLARENCE H. HAPGOOD, OF TOLEDO, OHIO, ASSIGNOR, BY MESNE ASSIGNMENTS, TO THE TOLEDO SCALE COMPANY, OF TOLEDO, OHIO, A CORPORATION OF OHIO.

SCALE.

1,203,611.

Specification of Letters Patent.    Patented Nov. 7, 1916.

Application filed December 29, 1911. Serial No. 668,404.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

My invention relates more particularly to pendulum scales, a characteristic of which is that in order to secure accurate weighing it is necessary that they be leveled or adjusted with reference to the vertical, otherwise the zero marking of the scale does not correspond identically with the true zero position of the pendulum and pointer. In order to overcome this difficulty it has been proposed to use a pair of pendulums so connected and jointly affecting the weight indications that any aberration of one caused by a displacement of the scale from its proper position with reference to the vertical will be offset by the corresponding aberration of the other.

The object of my invention is mainly to improve scales of this character by increasing the accuracy of their indication and diminishing their liability to error, and it consists in certain features and improvements embodied in the forms of scales illustrated in the drawings forming part of this application and described in detail in the following specification. It will be understood, however, that the specific forms are described only as the preferred embodiments of the invention, which may be realized in a great variety of other forms and the breadth of which is set out in the following claims.

Referring now to the drawings, Figure 1 is a substantially central vertical section of one form of my invention; Fig. 2 is an elevation, partly in section, of the same scale with one of the cover plates removed taken, however, at right angles to the plane of Fig. 1; Fig. 3 is a fragmentary cross section upon the line 3—3 of Fig. 1; Fig. 4 is a front elevation of a scale of different form embodying my invention; Fig. 5 is an elevation, partly in section, of the scale of Fig. 4 taken at right angles to the plane of the latter figure; Fig. 6 is an elevation, upon a small scale, of another application of my invention; and Fig. 7 is a section of a detail to be referred to hereinafter.

A comparison of the several views will disclose that in each form of scale shown substantially the same counterbalancing and indicating mechanism is employed, modified, however, to adapt it to a particular type of scale, the general types shown being some of the familiar or common forms to which, among many others, the invention is applicable.

Referring now more particularly to that form of the invention illustrated in Figs. 1, 2, and 3, it will be seen that it is a suspended or swinging scale and comprises a casing 8 with a perforated ear 9 by which it may be suspended, and a commodity receptacle or pan 10. The casing comprises a cast framework 11 which supports the operative parts of the scale and is provided with windows 12—12 by which the working of the mechanism may be observed, and cover plates 13—13, 14—14 by which the mechanism is in the main inclosed. In this form of the invention the indicating means for indicating the weight of any commodity upon the pan and computing the value thereof takes the form of a cylinder which is in effect divided centrally and spaced apart upon opposite sides of the operating mechanism and inclosed in cylindric casings 15—15 attached to the central casing 15' on opposite sides thereof. These casings are provided with the usual observation openings 16—16 which need not be described in detail here, and within them and extending therethrough and through the main casing is a shaft 17 which is journaled in any suitable manner at its opposite ends within the casing and carries the drums or rotary cylinders 17', 17' upon which the weight and value indications are printed. Upon the shaft at approximately its center is mounted a pinion 18 with which engages a rack 19 connected by a rod 20 and spring 21 with a portion of the scale mechanism which is connected to the scale pan and moved vertically a distance proportional to the weight of the commodity upon the scale pan. The mounting and construction of this movable element is as follows: The casting or framework of the casing is formed with a pair of columns or uprights 22, 22 which are spaced apart and present on their remote sides smooth vertical bearing faces or tracks 23, 23 (see Fig. 1, in which these uprights are broken away at their lower ends to show other features of the construction). At the upper ends of these tracks or faces are secured the members of a pair of ribbons 24 of steel or other suitable material, the lower ends 25, 25 of which are secured respectively to the convex cylindrical faces of segments 26, 26, which segments are in turn rigidly mounted upon short shafts 27 to which are likewise secured the pendulums 28, 28. These shafts are connected at their corresponding ends by crosspieces 29, 29 (see particularly Figs. 1 and 2), through which said shafts extend at their ends, and in which they are mounted for oscillation, the openings being somewhat elongated, as shown at 30 in Fig. 1, to provide for a slight play of the shafts toward and from each other for a purpose which will be understood later. These cross-pieces are connected intermediate their ends by a strut 31, to which the spring 21, referred to above and connected to the rack rod for operating the indicator, is secured. The outer or free end of the spring 32 is perforated, and the rack rod 20 extends through the perforation, the spring being clamped on opposite sides between the nut 33 and the split clamping sleeve 34 on the rod. A weight 35 upon the upper end of the rod presses it against the pinion.

Upon each of the shafts carrying the above described segments and pendulums is mounted a second segment 36 extending generally in the same direction from the shaft as the segment 26, but of somewhat greater radius, and to the upper end of the curved face of the second segment is secured a ribbon 37 which, together with its counterpart upon the other segment, serves as a member of the connection between the segments and pendulums on the one hand and the scale pan on the other. At their lower ends the last named ribbons 37 are attached to vertically movable rectangular frames, each comprising a pair of longitudinally extending members 38, 38 and a pair of cross-members 39, 40. To each upper cross-member 40 at its middle is secured one of the above mentioned straps 37, and to each lower crosspiece 39 is attached at its center a strap 41, the pair of straps 41, 41 constituting a support for the shell or cylinder 42 of a dashpot, to the lower end of which is connected the scale pan by means of a hook 43 and eye 44 (see Fig. 1). The connection of the straps 41 to the dash-pot is by means of stirrups 45, 45 carried at the lower ends of the straps and provided with bearings 46, 46 for the cones 47, 47 which project from the lower faces of the ears 49, 49 with which the upper end of the dash-pot is provided. The piston of the dash-pot, which may be of any usual or approved form, is connected by its rod 50 with a bracket 51 which may be secured to any convenient stationary portion of the casing or frame. Upon the ends of the ears 49 are fastened spring plates 52 which are bent over the upper faces of the ears and extend within the loops of the stirrups and bear against the lower edges thereof to hold the bearings 46, 46 against their cones and prevent displacement of the stirrups from the ears. The casing is reduced as at 53 to loosely receive the dashpot, which latter is reduced as at 54 the reduced portion reciprocating within an opening in the bottom plate 55. The piston is movable in the reduced portion of the dashpot, as indicated in dotted lines in Fig. 1, the enlarged upper portion of the dashpot, being adapted to contain an increased quantity of oil. The ears 49 above mentioned project on diametrically opposite sides beyond the periphery of the dash-pot and the framework of the casing is formed at its lower end with vertical uprights which constitute channels for the projecting ears. Rubber or other resilient buffers 56 cushion the dash-pot at the lower limit of its movement.

The weights 28 are adjustable longitudinally upon the pendulum rods by means of set nuts 57—57 upon the pendulum rods and resilient buffers 58—58 are mounted upon brackets 59—59 attached by screws 60 to ledges 61—61 formed upon the framework of the casing, the buffers being arranged in the path of the ends of the pendulum rods to limit their inward movement. It is to be noted also that for the sake of compactness the pendulum rods are formed with an angle and the pendulum weights are brought substantially beneath the point of bearing of the segments 26 upon the uprights 22 when the scale is in normal position. Each element comprising a pendulum shaft and two segments constitutes a counterbalance member the balancing effect of which upon the beam is increased as its pendulum is swung outward and upward.

Upon one of the ledges 61 is secured a bracket 62 which is formed of a plate or strip twisted a quarter turn intermediate its ends and bifurcated or indented at its outer end and straddling the journaled shaft 17 to support the latter with its pinion in engagement with the rack, and the latter is prevented from moving backward away from the pinion by means of an antifriction roller 63, borne by bracket 64, secured to the other ledge 61. Since as a matter of convenience of manufacture and external appearance the sight windows 16 are carried continuously from end to end of the cylinder casing and hence across the casing containing the operating mechanism, I preferably provide plates 65—65 which bridge the central space containing the operating mechanism and shield the latter from observation. If desired, these plates may be used as name plates.

The shaft carrying the revoluble parts is of considerable length and on this account and by reason of its normally occupying the same angular position is apt to become permanently flexed in one direction. In order to correct for any such flexure, I provide the shaft with a pair of flanged collars 66—67 (see particularly Figs. 2 and 7) which are secured rigidly to the shaft by pins 68—69 a slight distance apart, and connected by adjusting screws 70—71 extending through the flanges toward their peripheries there being preferably four such screws equally spaced around the shaft. Obviously by tightening up the proper screws pressure may be brought upon the shaft at this point tending to bend it in any direction and hence to correct any eccentricities or flexure thereof.

It will now be obvious that when a weight is placed upon the scale pan 10 its effect is transmitted through the dash-pot, the ribbons 41—41, frames 38—38, ribbons 37—37 and segments 36—36 to the shafts 27—27 upon which the pendulums are mounted and these shafts are therefore rotated until the pendulums are raised sufficiently to counterbalance the weight in the pan. In rotating the shafts, however, the segments 26—26 are turned therewith and the shafts, segments and attached parts including the cross pieces 29—29 are raised as the segments 26—26 rotate upon the straps 24—24 and the columns 22—22 upon which they bear. Should the scale for any reason as for example by the distribution of weight in the pan be tilted or displaced from the perpendicular that one of the pendulums on the lower side will be less displaced from its normal position by the weight of the commodity than that on the higher side of the scale. The indication however, by reason of the intermediate connection of the rack to the counterbalance systems will give a mean reading. The play between the cross-pieces 29 and shafts 27 permits the differential movements of the counterbalance members and the dash-pot by reason of its loose mounting tilts sufficiently to constitute an equalizer between the ribbons attached thereto and permit their unequal movement.

I have heretofore referred to the segments 26 and 36 as though their bearing surfaces were true arcs of circles, and in fact they might be so made, but in that event the rotary travel or angular displacement of the chart would not correspond increment for increment with the addition of load to the pan, for the reason that the turning movement or torque of the pendulums increases more rapidly at some portions of their paths than at others. Therefore, if the bearing surfaces of the segments were true arcs of concentric circles the distance between the weight indications upon the chart must necessarily be varied. In order, however, to correct for this variation in the mechanism itself, and employ a chart having equally spaced weight indications, I may vary the bearing surfaces of the segments 26—36 or either of them or their eccentricity with respect to each other that each equal increment of weight from zero to the capacity of the scale is represented by the same angular displacement of the rotary chart. In the particular construction illustrated, the segments are true arcs but eccentric with respect to each other. These are somewhat longer than the normal operation of the scale requires and by adjusting the part actually effective the extent of movement of the chart per unit increment of weight can be adjusted to the markings of the chart. For this purpose the segments are angularly adjustable with relation to their shafts and adjustment is positively effected by set screws 72—73 extending through lugs 74—75 upon the hubs of the segments and bearing upon lugs 76 upon the hubs or collars of the pendulums, these hubs or collars being rigidly attached or keyed to the shafts. After this adjustment has been effected it may be rendered permanent, if desired, by means of screw bolts 77—77 extending through slots 78—78 in the collars by which the pendulums are secured to the shafts and into tapped holes in the hubs of the segments. It will be clear that with this structure any moderate displacement of the scale from its true position with reference to the vertical will not affect the accuracy of the weighing for the excessive displacement of one pendulum is offset by the diminished displacement of the other pendulum and the connection for operating the chart being attached midway between the two pendulum systems, the indication is the mean of the two and therefore unaffected. Furthermore, by reason of the symmetry of my system and the fact that wear, elongation and other developments during service are substantially equal on both sides of the system the angular displacement of the chart, due to any particular increment of weight varies but little and with the indicating mechanism properly adjusted to indicate zero when there is no weight in the scale, the weighing will remain substantially accurate for a remarkable length of time.

In the modification just described, my invention is used in connection with a hanging scale. However, it may be employed in various other forms of scales in each of which it will present substantial advantages. In the modification shown in Figs. 4 and 5 my invention is applied to a beam scale, the indicator in this instance being arranged above instead of on opposite sides of the counterbalancing mechanism. Upon a base 79 is mounted a casing 80 for the counterbalancing mechanism and indicator and the scale beam 81 is pivoted in bearings 82 in columns 83 arising from the base. Upon the beam 81 is pivoted at 82' a platform or commodity receiver 83' of any usual or approved type which is maintained in approximately horizontal position by a high check bar 84 connected by a check link 85 (shown in dotted lines in Fig. 5) to the casing 80. Upon the front of the casing is mounted a tare beam 86, the knife edges of which (indicated in dotted lines at 87, see Fig. 4) rest in bearings supported upon bracket 86' secured to the casing by screws 87' and the check 84 is connected to this tare beam in a suitable manner as by a strap 88. The indicator 13 may be of any ordinary construction and I have shown it as a rotary drum contained in a cylindrical housing 89 with sight openings 90—91. The chart may be journaled in any suitable manner and upon its shaft is mounted a pinion 92 which is engaged by a rack 93 which is indirectly connected with the beam and counterbalancing mechanism. The latter is mounted in an enlargement 94 of the casing intermediate the chart housing and the base which enlargement is shown as provided with windows 95 at front and back. As in the earlier described modification, the counterbalancing means is in duplicate and each counterbalancing member includes segments 26', 36', and a pendulum 28' and is suspended by a ribbon 24' from an upright 22' along the outer face of which the segment 26' is adapted to travel. The beam of the scale extends at its end through a loop 96 formed on the bottom of the dash-pot 42' which extends through an aperture 97 formed in the bottom of the casing for this purpose. The dash-pot is in turn connected by frames 38'—38', having stirrups 98—98 taking over the lugs 49', 49' on the dash-pot, and straps 37' 37' with the segments 36'. Cross bars 29'—29' connect the shafts upon which the segments and pendulums are mounted and the rod 99 carrying the rack 93 is secured to these cross pieces at about the center thereof for the purpose stated in connection with the earlier described modification. It is unnecessary to further describe the features which this modification has in common with that of Figs. 1, 2 and 3 or to describe the operation thereof, this form of platform scale being well-known and its operation in connection with my improved counterbalancing mechanism being obvious in view of the description of the first modification. It will be seen, however, that the counterbalancing mechanism properly designed and proportioned may be made to offset the weight of the beam and attached parts so that without the special provision of weight the scale will be counterbalanced with the commodity receiving platform empty.

In Fig. 6, I have indicated a still further use to which my improved counterbalancing means may be put for I have there shown a platform scale of the type ordinarily used for weighing articles of considerable weight, the frame lever mechanism, etc., being of the type common in scales of this character but the link or connecting rod 100 attached to my counterbalancing mechanism indicated at A similar to that shown in Figs. 1, 2 and 3 in the same manner as is the scale pan in the first described modification and the lever in that of Figs. 4 and 5.

Many other forms of scales and connections in which my counterbalancing and indicating mechanism may be used will suggest themselves to those skilled in the art and it will also be apparent that numerous changes in the specific mechanism employed may be made without departing from the spirit of my invention as set forth in the following claims.

I claim.

1. In a scale, a commodity receptacle, a counterbalancing means for the receptacle and the commodity contained therein comprising a pendulum, a segment connected to the pendulum for oscillation therewith, a support, a strap secured to said support and to the lower end of said segment, a second segment whose arc is eccentric to that of the former said segment connected thereto and to the pendulum for movement therewith, a strap connected at one end to the upper end of the arc of the second said segment and at its other end to the commodity receptacle and adapted to lie upon the periphery of the second said segment.

2. In a scale, a commodity receptacle, counterbalancing means for the receptacle and commodity contained therein comprising a pendulum, a circular segment connected to the pendulum for oscillation therewith, a substantially vertical support with which the segment has rolling engagement, a second segment having an eccentric arc connected to the pendulum and former said segment for movement therewith, a vertically movable element with which the second said segment engages at its periphery and by which the latter is operated and connections between the vertically movable element and the commodity receptacle.

3. In a scale, a commodity receptacle, counterbalancing means for the receptacle and commodity contained therein comprising a pendulum, a circular segment connected to the pendulum for oscillation therewith, a support, a strap engaging the arc of said segment at its lower end and the support at its upper end, a second segment having an eccentric arc connected to the pendulum and former said segment for movement therewith, a vertically movable element with which the second segment engages at its periphery and by which it is operated, and connections between the vertically movable element and commodity receiver.

4. In a scale, a commodity receptacle, counterbalancing means for the receptacle and commodity contained therein comprising a pendulum, a circular segment connected to the pendulum for oscillation therewith, a support, a strap connected at its lower end to the segment and at its upper end to the support, a second segment having an eccentric arc and connected to the pendulum and former said segment for movement therewith, a strap connected at its upper end to the upper end of the arc of the latter segment and at its lower end provided with connections to the commodity receptacle.

5. In a scale, a commodity receptacle, counterbalancing means for the receptacle and commodity contained therein comprising a pendulum, a segment connected to the pendulum for oscillation therewith, a substantially vertical support with which the segment has rolling engagement, a second segment having an eccentric arc and connected to the pendulum and former said segment for movement therewith, means for adjusting the second said segment angularly with respect to the pendulum, a vertically movable element with which the second segment engages at its periphery and by which the latter is operated, and connections between the movable element and the commodity receiver.

6. In a weighing scale, a support or frame, a commodity receptacle, a pair of oppositely arranged counterbalance members, each comprising a pendulum, a vertically moving frame connecting corresponding points on the two counterbalance members, an indicator comprising a movable element, and connections from an intermediate point on said vertically movable frame to said movable element of the indicator, and connections from said counterbalance members to the commodity receptacle.

7. In a weighing scale, a support or frame, a commodity receptacle, a pair of oppositely arranged counterbalance members each comprising a pendulum, and a pair of supporting segments, tracks for said segments and ribbons connecting said segments and tracks, an indicator, connections from the counterbalance members to the indicator for operating the latter, an equalizer member, connections from opposite ends of the equalizer to the respective counterbalance members, and a connection from a point of the equalizer member intermediate said end connections to the commodity receptacle.

8. In a weighing scale, a support or frame, a commodity receptacle, a pair of oppositely arranged counterbalance members each comprising a pendulum, an indicator, connections from the counterbalance members to the indicator for operating the latter, a dash-pot connected at its lower end to the commodity receptacle, and connections from diametrically opposite portions of the dash-pot to the respective counterbalance members.

9. In a weighing scale, a support or frame, a commodity receptacle, a pair of oppositely arranged counterbalance members each comprising a pendulum, an indicator, connections from the counterbalance members to the indicator for operating the latter, a pair of segments each constituting an element of one of the counterbalance members, straps secured to and operating upon the arcs of the segments, vertically movable frames to which the lower ends of the straps are respectively connected, a dash-pot connected at its lower end to the commodity receptacle, and connections from the vertically moving frames to opposite sides of the dash-pot.

10. In a weighing scale, a support or frame having oppositely arranged bearing faces, a pair of segments connected and arranged to rock upon said bearing faces, a second pair of segments rigidly connected to the former said pair, straps secured to the upper ends of the arcs of the segments of the second pair and arranged to engage the curved faces of said arcs, vertically movable frames connected to said straps respectively, a dash-pot connected at its lower end to the commodity receptacle, straps, respectively connecting the lower ends of the vertically movable frames with opposite portions of the dash-pot, and pendulums rigidly connected to and moving with the respective segments of each pair.

11. In a weighing scale, a frame presenting oppositely disposed vertical surfaces, segments arranged and adapted to rock upon said surfaces, a pair of shafts carried by said segments, pendulums carried by the respective shafts, a pair of eccentric segments likewise carried by the respective shafts, a commodity receptacle, and connections from the eccentric segments to the commodity receptacle, a frame connecting the ends of the shafts, an indicator, and means connected to the frame for operating the indicator.

12. In a weighing scale, a rotary chart, a shaft upon which the chart is mounted, a pair of collars mounted on the shaft and spaced slightly apart with adjacent faces approximately parallel, and means for exerting pressure on the collars at various points about the shaft tending to flex the latter.

13. In a weighing scale, a rotary chart, a shaft on which the chart is mounted, a pair of flanged collars mounted on the shaft and spaced slightly apart, with adjacent faces of the flanges approximately parallel, and screws connecting the collars at one or more points about the shaft to exert a pressure tending to flex the shaft.

14. In a scale, a commodity receptacle, a pair of counterbalance members each comprising a pendulum, a segment connected to said pendulum for oscillation therewith, and a second segment having an eccentric arc likewise connected to said pendulum for oscillating therewith, vertically movable means engaging the arc of each said second segment, an equalizer member connecting said means and a substantially central connection from said member to the commodity receptacle.

15. In a weighing scale, a commodity receptacle, a pair of counterbalance members each comprising a pendulum, a segment connected to said pendulum for oscillation therewith, and a second segment likewise connected to said pendulum, means connecting the latter segment of each counterbalance member with the commodity receptacle, means connecting corresponding points on the counterbalance members together, an indicator, and connections from the last said means to the indicator.

16. In a weighing scale, a frame or support, a commodity receptacle, a pair of counterbalance members for the receptacle and commodity to be weighed, each member comprising a pendulum, and a pair of segments having arcs eccentric to each other, said segments rigidly connected for joint movement with the pendulum, said support having two vertical bearing surfaces, with each of which one of the segments of a counterbalance member engages with a rolling contact, and means engaging each of the other segments of said counterbalance members and connected to an equalizing member, and a connection from a point intermediate the points of engagement of said means to the commodity receptacle.

17. In a weighing scale, a frame or support, a commodity receptacle, a pair of counterbalance members for the receptacle and commodity, each comprising a pendulum, a circular segment, and an eccentric segment rigidly connected for joint movement with the pendulum and with each other, said support having two vertical bearing surfaces upon each of which one of the segments of a counterbalance member rocks, and vertically movable means engaging the arcs of the eccentric members, an equalizer member to the ends of which said means are connected and which is in turn connected to the commodity receptacle.

18. In a weighing scale, a pair of oppositely arranged counterbalance members, each comprising a pendulum, a circular segment, and an eccentric segment, a support having vertical bearing surfaces upon which the circular segments rock, straps connecting the eccentric segments to the commodity receptacle, cross pieces connecting corresponding points upon the counterbalance members, an indicator having a movable element, and connections from the cross pieces to the movable element of the indicator.

19. In a weighing scale, a commodity receptacle, a pair of oppositely arranged counterbalance members each comprising a pendulum, a circular segment, and an eccentric segment, a support, straps connected to the support and the circular segments, straps connected to the eccentric segments and to the commodity receptacle, a frame connecting corresponding points on the counterbalance members and movable vertically therewith, a weight indicator, a rod connected to the movable element of the latter to operate the same, and a spring connecting the vertically movable frame and the rod.

20. In a weighing scale, a commodity receptacle, a pair of oppositely arranged counterbalance members each comprising a pendulum, a circular segment, and an eccentric segment, a support, straps connected to the support and the circular segments, straps connected to the eccentric segments and to the commodity receptacle, a frame connecting corresponding points on the counterbalance members and movable vertically therewith, a weight indicator, a rod connected to the movable element of the latter to operate the same, and a spring adjustably connecting the vertically movable frame and the rod.

21. A weighing scale comprising oppositely arranged counterbalance members, a frame connecting such members, a rod connected to substantially the center of said frame and adjustable with relation thereto, an indicator, means on the rod for operating the indicator, a commodity receptacle, and connections between the counterbalance members and the commodity receptacle.

22. In a scale of the class described, a pair of counterbalance members each comprising a pair of supporting segments, a pendulum and an intermediate eccentric segment, pairs of vertical pillars upon which the supporting segments are arranged to rock, connections between said pillars and segments for supporting the latter in position, strips 29 connecting the axes of the counter-balance members, a bar connecting the strips 29, a rack bar resiliently suspended from the said last named bar, a dial, a hand having on the shaft thereof a gear meshing with said rack, ribbons mounted on said eccentric segments, vertically moving frames 38 to which said ribbons are attached, a dashpot cylinder having outwardly extending lugs 49, 49, flexible connections between the said lugs and said vertically movable frames, a load receptacle connected to said dashpot cylinder, and a piston in the dashpot the rod of which is connected to a relatively stationary part of the scale frame.

23. In a weighing scale and in combination with the casing thereof, a load receiver, columns 22, load counter-balancing members comprising segments 26, straps 23 connecting said segments and the upper ends of said columns whereby the segments are supported, pendulum members connected to the segments, a second segment connected to each pendulum member, and flexible ribbons connected to and extending over said second segments and connected to the load receivers, connections between said load counter-balancing members, a leaf spring mounted on said connections, a rack bar connected to the leaf spring, a rack connected to the rack bar, an indicator, a gear connected to the indicator and engaging the rack and a weight connected to the rack bar and adapted to urge the rack into contact with the gear.

24. In a weighing scale, a pair of counterbalance members each comprising a pendulum, a pair of supporting segments and an intermediate segment, a load receiver, flexible connections from each intermediate segment to the load receiver, upright tracks for the first said segments, flexible connections between such segments and the tracks, cross bars 29 connecting the counterbalance members, there being provision for play in the connections, a rack bar and rack carried by said cross bars, a rotary indicator and a pinion thereon engaging said rack.

25. In a weighing scale and in combination with the load receiver thereof, four upright members having tracks thereon, a pair of counterbalancing members each comprising a shaft, a pair of segments mounted on the shaft and engaging said tracks, flexible connections between said segments and tracks, and intermediate segments, connections between said intermediate segments and the load receiver, a weight mounted eccentrically with respect to the shaft of each counterbalance member, a pair of cross bars slotted at their ends and engaging said shafts but having play with respect thereto, connection between said cross bars, a rack bar secured to said connection and an indicator revolved by the rack bar.

26. In a weighing scale, a central casing, a supporting framework inclosed therein, load counter-balancing members supported upon the framework comprising oppositely-disposed pendulums, a commodity receiver connected with said load counter-balancing members, a pair of cylindrical casings secured respectively upon the opposite sides of the framework and extending laterally from the central casing, indicator drums mounted in said casings, connecting members between the counter-balancing members, and connections from said connecting members to said indicator drums for operating the latter.

CLARENCE H. HAPGOOD.

Witnesses:
H. S. BERGEN,
L. D. BAKER.